United States Patent
Wu et al.

(10) Patent No.: US 12,474,953 B2
(45) Date of Patent: Nov. 18, 2025

(54) TASK SCHEDULING METHOD AND SYSTEM

(71) Applicant: COMPUTER NETWORK INFORMATION CENTER, CHINESE ACADEMY OF SCIENCES, Beijing (CN)

(72) Inventors: Can Wu, Beijing (CN); Xiaoning Wang, Beijing (CN); Haili Xiao, Beijing (CN); Xuebin Chi, Beijing (CN); Rong He, Beijing (CN); Shasha Lu, Beijing (CN)

(73) Assignee: COMPUTER NETWORK INFORMATION CENTER, CHINESE ACADEMY OF SCIENCES, Beijing (CN)

( * ) Notice: Subject to any disclaimer, the term of this patent is extended or adjusted under 35 U.S.C. 154(b) by 950 days.

(21) Appl. No.: 17/635,260

(22) PCT Filed: Aug. 24, 2021

(86) PCT No.: PCT/CN2021/114299
§ 371 (c)(1),
(2) Date: Feb. 14, 2022

(87) PCT Pub. No.: WO2022/105337
PCT Pub. Date: May 27, 2022

(65) Prior Publication Data
US 2023/0342191 A1    Oct. 26, 2023

(30) Foreign Application Priority Data
Nov. 23, 2020 (CN) .......................... 202011322687.2

(51) Int. Cl.
G06F 9/46 (2006.01)
G06F 9/48 (2006.01)
G06F 11/34 (2006.01)

(52) U.S. Cl.
CPC ........ *G06F 9/4881* (2013.01); *G06F 11/3409* (2013.01)

(58) Field of Classification Search
CPC ...... G06F 9/4881; G06F 9/4887; G06F 9/546; G06F 9/4843; G06F 11/3409;
(Continued)

(56) References Cited

U.S. PATENT DOCUMENTS 7,013,482 B1 * 3/2006 Krumel ............... H04L 63/0227
726/13
2005/0071843 A1 * 3/2005 Guo ........................ G06F 9/505
718/104

(Continued)

FOREIGN PATENT DOCUMENTS

CN      101599026 A     12/2009
CN      103324534 A     9/2013
(Continued)

OTHER PUBLICATIONS

International Search Report (PCT/ISA/210) mailed on Nov. 10, 2021, by the China Patent Office as the International Searching Authority for International Application No. PCT/CN2021/114299. (4 pages).

*Primary Examiner* — Mehran Kamran
*Assistant Examiner* — Zhi Chen
(74) *Attorney, Agent, or Firm* — Buchanan Ingersoll & Rooney PC (57) ABSTRACT

The system includes a job request collection and distribution module, a scheduling service module and a job execution service module. The job request collection and distribution
(Continued)

module receives first description information of a job to be executed from a user terminal. A current scheduling service module matched with a job scheduling algorithm name in at least one scheduling service module determines a computing resource required by the job to be executed according to the first description information, and then determines a job scheduling result according to the required computing resource and currently available cluster computing resources. The job is submitted to a high-performance computer through a current job execution service module matched with a job execution service name in at least one job execution service module according to a device identifier and a global identifier of the job to be executed contained in the scheduling result.

12 Claims, 2 Drawing Sheets

(58) Field of Classification Search
CPC ............... G06F 11/34; G06F 11/3404; G06F 2209/482; G06F 2209/547; G06F 2209/548
See application file for complete search history.

(56) References Cited

U.S. PATENT DOCUMENTS

| | | | |
|---|---|---|---|
| 2013/0024870 A1* | 1/2013 | Yamashita | G06F 9/4881 718/104 |
| 2014/0101666 A1* | 4/2014 | Jackson | G06F 9/5038 718/104 |
| 2014/0189702 A1* | 7/2014 | Yan | G06F 9/5027 718/104 |
| 2016/0098292 A1 | 4/2016 | Boutin et al. | |
| 2017/0034070 A1* | 2/2017 | Kollur | H04L 47/781 |
| 2019/0327238 A1* | 10/2019 | Chen | H04L 63/102 |
| 2021/0374007 A1* | 12/2021 | Von Hein | G06F 16/128 |
| 2022/0383219 A1* | 12/2022 | Liu | G06F 9/5011 |

FOREIGN PATENT DOCUMENTS

| | | | | |
|---|---|---|---|---|
| CN | 104123182 A | | 10/2014 | |
| CN | 103324534 B | * | 8/2016 | |
| CN | 107656741 A | * | 2/2018 | ............ G06F 8/61 |
| CN | 110830564 A | * | 2/2020 | ........... H04L 61/1511 |
| CN | 111126895 A | | 5/2020 | |
| CN | 111352717 A | * | 6/2020 | ........... G06F 9/45558 |
| CN | 109684065 B | * | 11/2020 | ............ G06F 9/4881 |
| CN | 112306719 A | | 2/2021 | |

* cited by examiner

TASK SCHEDULING METHOD AND SYSTEM

The application claims priority of a Chinese patent application filed before the China State Intellectual Property Office on Nov. 23, 2020 with application number 202011322687.2 and titled as "Task Scheduling Method and Device", the entire contents of which are hereby incorporated by reference.

TECHNICAL FIELD

The application relates to the field of high-performance computing, in particular to a task scheduling method and system.

BACKGROUND ART

A cross-cluster computing service environment integrates computing resources of clusters distributed in different regions or even belonging to different organizations, and provides a unified computing service environment for users. The cross-cluster computing service environment shields the heterogeneity of underlying computing resources, job management systems, access methods, management systems, etc., and provides users with high-level computing application services with unified access portals, usage methods and user technical support.

Different from the traditional job scheduling concept, various task scheduling algorithms of the cross-cluster computing service environment are resource selection and matching among clusters on a cluster job resource management system, belonging to task scheduling in an application layer. In view of cross-cluster computing featuring high concurrency, multiple computing models and big data storage, how to allocate computing tasks reasonably and make full use of computing resources, and achieve the best energy efficiency while meeting users' application needs, is the most basic and urgent problem of a task scheduling strategy.

SUMMARY OF THE INVENTION

The purpose of this application is to solve the problems existing in the prior art, and to quickly integrate different task scheduling algorithms into a cross-cluster computing environment by means of software configuration without affecting running services.

In a first aspect, the application provides a task scheduling system, comprising: a job request collection and distribution module, at least one scheduling service module and at least one job execution service module, wherein the job request collection and distribution module is configured to receive a job execution request of a job to be executed, the job execution request comprises request description information of the job to be executed, and the request description information comprises a job scheduling algorithm name and a global identifier of the job to be executed; a current scheduling service module matched with the job scheduling algorithm name in the at least one scheduling service module is configured to determine a job scheduling result according to the request description information and computing resource information of at least one available computing cluster, and the job scheduling result comprises a job global identifier, a device identifier of a high-performance computer for executing the job to be executed, and a job execution service name; and a current job execution service module matched with the job execution service name in the at least one job execution service module is configured to receive the scheduling result determined by the current scheduling service module, and submit the job to be executed to the high-performance computer for executing the job to be executed according to the device identifier and the global identifier of the job to be executed contained in the scheduling result.

Preferably, the current scheduling service module is further configured to generate job description information based on the request description information and the job scheduling result, and provide the job description information to the job request collection and distribution module; and the job request collection and distribution module is further configured to distribute the job description information to the current job execution service module according to the job execution service name contained in the job scheduling result in the job description information.

Preferably, the request description information further comprises an application name required by the job, a queue name required by the job, and a CPU count of the high-performance computer required by the job; and the current scheduling service module matched with the job scheduling algorithm name in the at least one scheduling service module may further be configured to acquire computing resource information, the computing resource information comprises an application list and an application resource, the application list is configured to indicate at least one application deployed in at least one high-performance computer in the at least one available computing cluster, the application resource is configured to indicate at least one computing queue that each high-performance computer in the at least one computing cluster contains, and each computing queue comprises a CPU count of its corresponding high-performance computer.

Preferably, the job request description information further comprises one or more of a job name, a version of an application required by the job, and an expected wall time of the job.

In a second aspect, the application provides a task scheduling method, comprising: receiving a job execution request of a job to be executed, the job execution request comprising request description information of the job to be executed, and the request description information comprising a job scheduling algorithm name and a global identifier of the job to be executed; determining, by a current scheduling service module matched with the job scheduling algorithm name in the at least one scheduling service module, a job scheduling result according to the request description information and computing resource information of at least one available computing cluster, the job scheduling result comprising a job global identifier, a device identifier of a high-performance computer for executing the job to be executed, and a job execution service name; and receiving, by a current job execution service module matched with the job execution service name in the at least one job execution service module, the scheduling result determined by the current scheduling service module, and submitting the job to be executed to the high-performance computer for executing the job to be executed according to the device identifier and the global identifier of the job to be executed contained in the scheduling result.

Preferably, the method further comprises: generating, by the current scheduling service module, job description information based on the request description information and the job scheduling result, and providing the job description information to the job request collection and distribution module; and distributing, by the job request collection and distribution module, the job description information to the current job execution service module according to the job execution service name contained in the job scheduling result in the job description information.

Preferably, the request description information further comprises an application name required by the job, a queue name required by the job, and a CPU count of the high-performance computer required by the job; and the method may further comprise: acquiring, by the current scheduling service module, computing resource information, wherein the computing resource information comprises an application list and an application resource, the application list is configured to indicate at least one application deployed in at least one high-performance computer in the at least one available computing cluster, the application resource is configured to indicate at least one computing queue that each high-performance computer in the at least one computing cluster contains, and each computing queue comprises a CPU count of its corresponding high-performance computer.

Preferably, the job request description information in the method further comprises a job name, a version of an application required by the job, and an expected wall time of the job.

According to the task scheduling method and system provided by the application, the task scheduling algorithm may be developed strictly according to the standard, finally an independent service is formed, that is, an independent scheduling service module is formed, a plurality of scheduling services are not mutually affected, and each scheduling service may be directly deployed to the computing cluster environment after being registered, so that original codes do not need to be modified, existing services are not affected, and high scalability is realized.

BRIEF DESCRIPTION OF THE DRAWINGS

In order to explain the technical solution in the embodiments of the invention more clearly, the drawings used in the embodiments will be briefly introduced below. Obviously, the drawings in the following description are only some embodiments of the invention, and for those of ordinary skill in the art, other drawings can be obtained according to these drawings without paying creative labor.

DETAILED DESCRIPTION OF THE INVENTION

The technical solution of the invention will be described in further detail with reference to the drawings and embodiments.

In the embodiments of the application, a multi-task scheduling algorithm integration device for a cross-cluster computing service environment decouples multiple task scheduling algorithms from a computing environment, and each task scheduling algorithm is an independent service. The multi-task scheduling algorithm integration device provides a cluster computing resource information query interface for scheduling algorithm developers, and clearly defines an input and output standard format of a task scheduling service. Each task scheduling algorithm is developed in strict accordance with the standard. When a scheduling algorithm integration device for a high-performance computing environment is used to integrate different scheduling algorithms, it is not necessary to know the implementation details of the scheduling algorithm, and integration may be performed according to the standard process, thus having high scalability. The developers of the scheduling algorithm may integrate the scheduling algorithm into the cross-cluster computing service environment by exchanging information according to the standard format without knowing the implementation details of system codes.

Each task scheduling algorithm is encapsulated as a service with unified input and output information. During integration, the service must be registered at first, an authorized service will get an authorization code, which will be written into a configuration file of the service, and then the service may be started. Every service is a jar file, and the service is started by Java's startup command Java-jar ***.jar.

Figure 1:
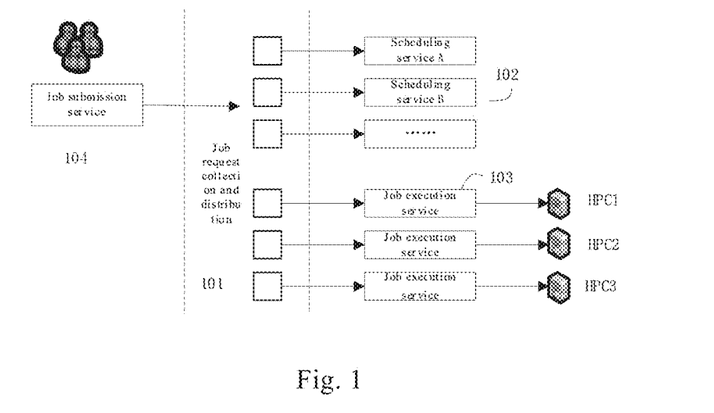
FIG. 1 is a diagram of a task scheduling system provided in an embodiment of the application.

FIG. 1 is a diagram of a task scheduling system provided by this application. As shown in FIG. 1, a multi-task scheduling algorithm integration device for cross-cluster computing services comprises at least one job request collection and distribution module 101, at least one scheduling service module 102 and at least one job execution service module 103. The number of the job request collection and distribution modules 101, the number of the scheduling service modules 102 and the number of the job execution service modules 103 may be equal or different. When the task scheduling system adopts a distributed cross-domain multi-cluster environment, a plurality of the forementioned modules may be deployed in the system. In addition, since an HPC usually has different location distributions, the implementation forms and geographical locations of other modules vary with requirements.

Figure 2:
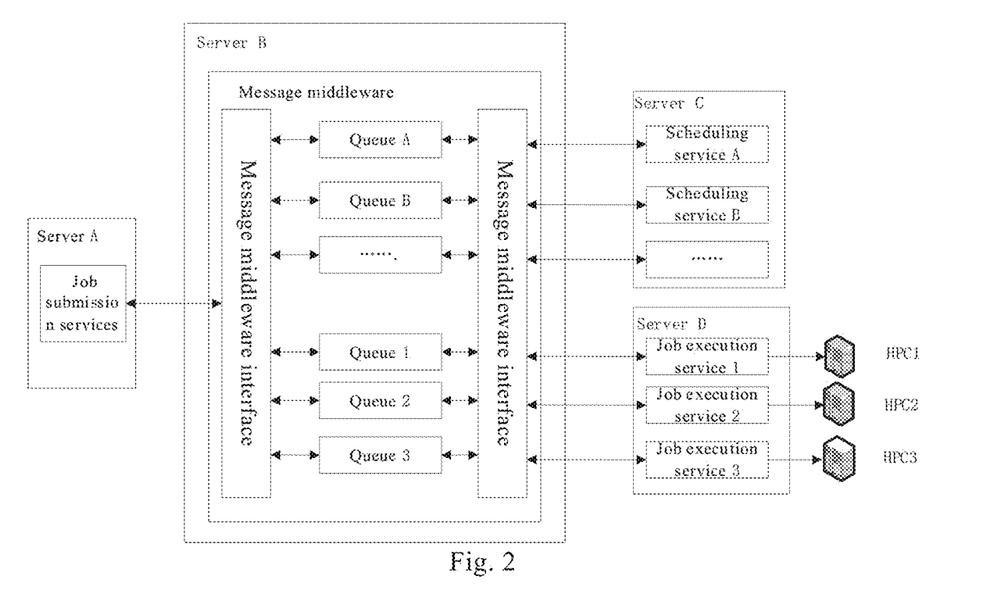
FIG. 2 is a diagram of another task scheduling system provided in an embodiment of the application.

In a possible embodiment, a job submission service, a scheduling service and a job execution service are all bottom-level services of a computer, and may be implemented by jar packages. The job collection and distribution module may be message middleware. As shown in FIG. 2, the job submission service, the message middleware, at least one scheduling service and at least one job execution service are respectively deployed on different servers.

It should be noted that the job submission service, the message middleware, the at least one scheduling service and the at least one job execution service may be deployed on one server or on multiple servers respectively. The deployment mode shown in FIG. 2 is only a specific implementation mode provided by the embodiment of this application, and does not limit the deployment of various services and message middleware in the embodiments of this application.

During integration, both scheduling services and job execution services need to be registered. During registration, an administrator will assign a service name to each registered service, and establish a message queue named after the service name for each service in the message middleware.

In an example, when assigning a service name to a scheduling service, an administrator may take an algorithm name of a scheduling algorithm used by the scheduling service as the service name.

In an example, since each job execution service corresponds to a high-performance computer, an upper management program may take a name of the high-performance computer corresponding to the job execution service as the name of the job execution service when assigning a service name to the job execution service.

In work, the user submits a job request through the job submission service, which detects the validity of job description information of a job to be executed included in the job request, and sends qualified job description information to the message middleware, which stores the job description information in a message queue matched with a job scheduling algorithm name according to the job scheduling algorithm name in the job description information.

The scheduling service periodically receives the job description information from its corresponding message queue and determines a job scheduling result according to the received job description information and computing resource description information of at least one available computing cluster, wherein the job scheduling result comprises a name of the high-performance computer. The scheduling service stores the job scheduling result and the job description information in a message queue matched with the name of the high-performance computer included in the job scheduling result.

The job execution service periodically receives the job description information and scheduling result information from its corresponding message queue, and submits the job to a specified HPC for running according to the HPC name assigned in the scheduling result.

In the task scheduling system shown in FIG. 1, the request collection and distribution module 101 receives a job execution request of the job to be executed, and the job execution request comprises request description information of the job to be executed. Table 1 illustrates request description information. As shown in Table 1, the request description information at least comprises a job scheduling algorithm name and a global identifier of the job to be executed. Optionally, the description information also comprises one or more of a job name, an application name required by the job, an application version required by the job, a queue name required by the job, a CPU count required by the job and estimated wall time of the job. Here, the application refers to an application provided by the high-performance computing environment, the queue refers to a computing queue that may be used by each application in the high performance computing environment, the CPU count refers to a CPU count of each computer in the computing queue, and the estimated wall time of the job refers to a minimum wall time required for the job for a specified application, a specified job queue, and a specified CPU count of the computer.

TABLE 1

| Parameter description | Parameter definition | Parameter type | Parameter example |
|---|---|---|---|
| Job global ID | jobgid | long | 1584339281253915849 |
| Job name | jobname | String | Testjob |
| Application name required by the job | applicationname | String | Gaussian |
| Application version required by the job | applicationversion | String | 1.0 |

TABLE 1-continued

| Parameter description | Parameter definition | Parameter type | Parameter example |
|---|---|---|---|
| Queue name required by the job | queuename | String | long |
| CPU count required by the job | cpucount | int | 10 |
| estimated wall time of the job | walltime | int | 100 |
| Job scheduling algorithm name | schedulername | String | AWFS |

The request collection and distribution module 101 determines a scheduling service module 102 from at least one scheduling service module 102 according to the job scheduling algorithm name in the description information, and sends the job execution request to the scheduling service module 102. When the job scheduling algorithm name is default, the scheduling service module 102 may be determined according to other information in the description information, or may be arbitrarily designated.

At least one scheduling service module 102 runs a job scheduling algorithm, and each service module 102 may run a different job scheduling algorithm and is configured with a cluster computing resource information query interface. The device may integrate different scheduling algorithms, and the currently integrated scheduling algorithms include AWFS (Application Weight First Schedule) and ATFS (Application Time First Schedule).

After receiving the job execution request, the scheduling service module matched with the job scheduling algorithm name in the at least one scheduling service module 102 determines the job scheduling result according to the request description information and the computing resource description information of the at least one available computing cluster.

In an example, the scheduling service module determines computing resources required by the job to be executed according to the description information, and then determines the job scheduling result according to the obtained computing resources required by the job to be executed and currently available cluster computing resource information obtained through an interface of the cross-cluster computing service environment.

In an example, the cross-cluster computing service environment provides an interface for querying cluster computing resource information. The interface may be one or more of a high performance computer (HPC) list query interface, an application list query interface, an application resource query interface and a job query interface or their combination. Detailed description and usage of each interface are shown in Table 2.

TABLE 2

| Interface name | Interface description | Request URL | Request category | Parameter |
|---|---|---|---|---|
| HPC list query | Query HPC list information provided by a high performance computing environment | /resources/hpcs | GET | Null |
| Application list query | Query application information provided by the high performance computing environment | /resources/applications | GET | host: the name of the HPC in the computing environment |
| Application resource query | Query computational queues available to applications in the environment | /resources/queues/{appName} | GET | host: the name of the HPC in the computing environment |
| Job query | Query job information in the environment, including all submitted jobs | /jobs | GET | host: the name of the HPC in the computing environment |

In an example, the high-performance computing environment may be deployed with different applications, and each application may be identified by an application name. If the description information specifies the application name of the application required by the job, the scheduling service module may query the application required by the job through an application resource query interface according to the application name. In some cases, an application has different versions. If the application version of the application required by the job is specified in the description information, the scheduling service module may query the application required by the job with the corresponding version through the application resource query interface.

In an example, the HPC in the high-performance computing environment may have different computing queues, and each computing queue has a queue name. If the description information specifies the name of the queue required by the job, the scheduling service module may query the computing queue that may be used to execute the job through the application resource query interface according to the queue name.

In an example, each computing queue may have a different available computing CPU count. When determining the calculation queue required by the job, the determined calculation queue should have a CPU count not less than that of the HPC required by the job.

The job scheduling result of the scheduling service module 102 may be shown in Table 3. In Table 3, the job scheduling result comprises a job global identifier, a device identifier of the HPC to be used for executing the job to be executed, and the job execution service name. The job execution service is named after a machine name, the scheduling result is the machine name, and scheduling is to assign the job to a certain machine.

TABLE 3

| Parameter description | Parameter definition | Parameter type | Parameter example |
|---|---|---|---|
| Job global ID | jobgid | long | 1584339281253915849 |
| HPC name | hpcname | String | watermelon |
| Job execution service name | fsname | String | frontserver1 |

In an example, the description information may also comprise the application name required by the job, the queue name required by the job, and the CPU count of the HPC required by the job, and the scheduling service module is also configured to obtain computing resource information. The computing resource information comprises an application list and an application resource, the application list is configured to indicate at least one application deployed in at least one HPC in the at least one available computing cluster, the application resource is configured to indicate at least one computing queue that each HPC in the at least one computing cluster contains, and each computing queue may comprise a CPU count of its corresponding HPC. In an example, a computing cluster may have multiple HPCs, and an HPC may have multiple queues.

In some possible embodiments, the current scheduling service module may also be configured to generate job description information based on the request description information and the job scheduling result, and provide the job description information to the job request collection and distribution module. Then, the job request collection and distribution module distributes the job description information to the job execution service module matched with the job execution service name according to the job description information.

The job description information is shown in Table 4.

TABLE 4

| Parameter description | Parameter definition | Parameter type | Parameter example |
|---|---|---|---|
| Job global ID | jobgid | long | 1584339281253915849 |
| Job name | jobname | String | Testjob |
| Application name required by the job | application name | String | Gaussian |
| Application version required by the job | application version | String | 1.0 |
| Queue name required by the job | queuename | String | long |
| CPU count required by the job | cpucount | int | 10 |
| estimated wall time of the job | walltime | int | 100 |
| HPC name | hpcname | String | watermelon |
| Job execution service name | fsname | String | frontserver1 |

A current job execution service module matched with the job execution service name in the at least one job execution service module 103 is configured to receive the scheduling result determined by the scheduling service module, and submit the job to be executed to a HPC for executing the job to be executed according to the device identifier and the global identifier of the job to be executed contained in the scheduling result.

In an example, the job execution service may be named after the name of the HPC, and the scheduling result information comprises the name of the HPC, that is, which HPC the job is to be scheduled to for execution. The job execution service named after this name will receive this message, and then the job is submitted to the HPC for execution. The function of the job execution service is to receive job information, and then submit the job information to the HPC for execution. This is because services may not be deployed and messages may not be received on HPCs, so front-end services are required to receive messages and submit them to HPCs for execution.

In the above embodiments, the job request collection and distribution module decouples the tightly coupled scheduling service module and job execution service module, which may improve the speed of problem solving, especially, reduce the possibility of potential hazards in the future.

Figure 3:
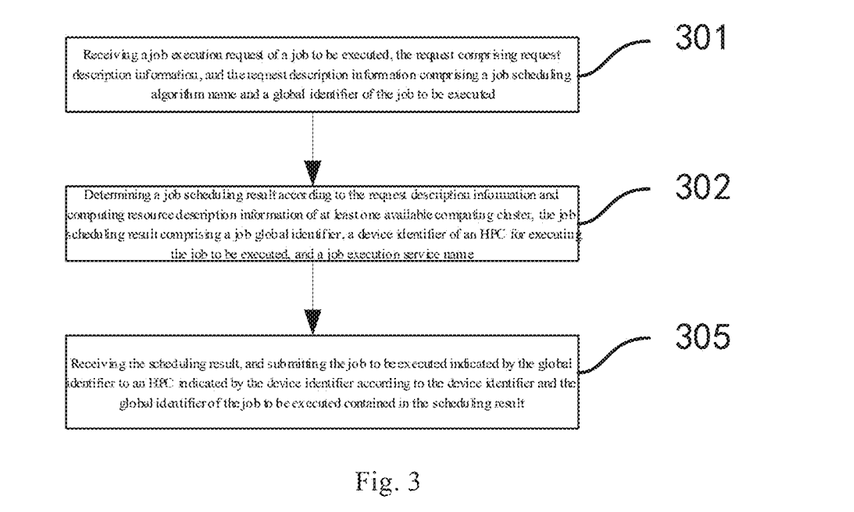
FIG. 3 is a flowchart of a task scheduling method provided in an embodiment of the application.

FIG. 3 is a flowchart of a task scheduling method according to an embodiment of the application, which may be implemented in the system shown in FIG. 1.

As shown in FIG. 3, the method may at least comprise the following steps 301, 302 and 305.

Step 301, receiving a job execution request of a job to be executed, the job execution request comprising request description information of the job to be executed, and the request description information comprising a job scheduling algorithm name and a global identifier of the job to be executed.

Step 302, determining a job scheduling result by means of a job scheduling algorithm according to the request description information and computing resource description information of at least one available computing cluster. In an example, the job scheduling result comprises a job global identifier, a device identifier of an HPC for executing the job to be executed, and a job execution service name.

Step 305, receiving, by the current job execution service module matched with the job execution service name in the job scheduling result, the scheduling result, and submitting the job to be executed to an HPC for executing the job to be executed according to the device identifier and the global identifier of the job to be executed contained in the scheduling result.

Finally, a specified HPC executes the job request.

Figure 4:
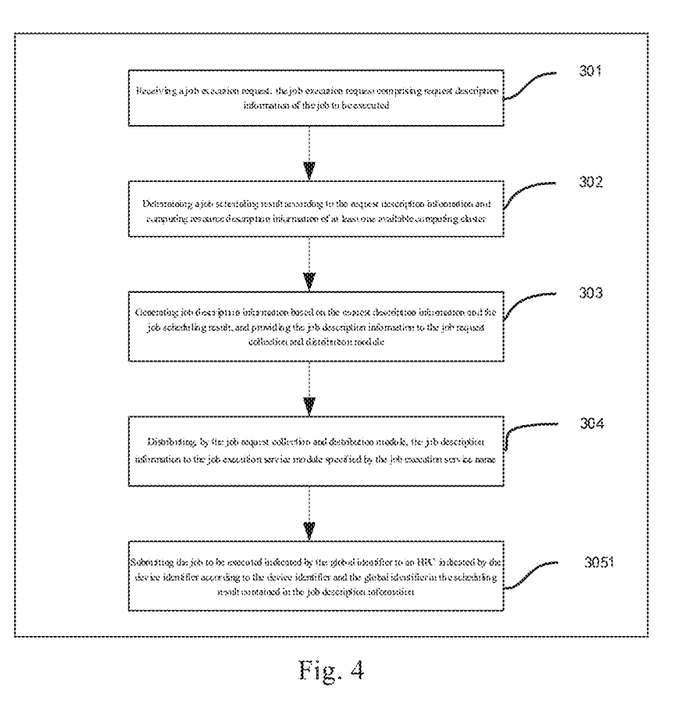
FIG. 4 is a flowchart of another task scheduling method provided in an embodiment of the application.

FIG. 4 is a flowchart of another task scheduling method provided in an embodiment of the application. Compared with the flow of FIG. 3, FIG. 4 also comprises Step 303 and Step 304 before Step 305.

Step 303, generating, by the current scheduling service module, job description information based on the request description information and the job scheduling result, and providing the job description information to the job request collection and distribution module.

Step 304, distributing, by the job request collection and distribution module, the job description information to the job execution service module matched with the job execution service name according to the job description information.

Accordingly, Step 305 may specifically comprise Step 3051, in which the job execution service module matched with the job execution service name receives the job description information, and submits the job to be executed to the HPC for executing the job to be executed according to the device identifier and the global identifier contained in the job description information.

Finally, a specified HPC executes the job request.

In some possible embodiments, a job submission service module may be deployed at a user terminal, and the job submission service module checks the validity of the job description information and sends qualified job description information to the job request collection and distribution module.

The task scheduling method and system provided by the application provide the cluster computing resource information query interface for scheduling algorithm developers, and clearly define the input and output standard format of task scheduling services. Each task scheduling algorithm is developed in strict accordance with the standard, and the scheduling algorithm for the high-performance computing environment is used by a task scheduling device containing various task scheduling services. Related personnel do not need to know the implementation details of the various task scheduling algorithms, and integration may be performed according to the standard process, thus having high scalability. The developers of the scheduling algorithm may integrate the scheduling algorithm into the cross-cluster computing service environment by exchanging information according to the standard format without knowing the implementation details of system codes.

In the specification provided herein, numerous specific details are described. However, it should be understood that embodiments of the invention may be practiced without these specific details. In some examples, well-known methods, structures and techniques have not been shown in detail in order not to obscure the understanding of this specification.

Obviously, those skilled in the art can make various changes and modifications to the invention without departing from the spirit and scope of the invention. Thus, if these modifications and variations of the invention fall within the scope of the Claims of the invention and their equivalents, the invention is also intended to include these modifications and variations.

The invention claimed is:

1. A task scheduling method, comprising:
   receiving a job execution request of a job to be executed, the job execution request comprising request description information of the job to be executed, the request description information comprising a job scheduling algorithm name and a global identifier of the job to be executed, the job scheduling algorithm name being a name of a job scheduling algorithm, and each of more than one scheduling service module being configured with an associated cluster computing resource information query interface for running one corresponding job scheduling algorithm;
   acquiring the job scheduling algorithm matched with the job scheduling algorithm name from the request description information through an associated cluster computing resource information query interface of one of the more than one scheduling service module matched with the job scheduling algorithm name from the request description information, and determining a job scheduling result of the job to be executed according to computing resource description information of at least one available computing cluster by using the job scheduling algorithm, the job scheduling result comprising the global identifier of the job to be executed, a device identifier of a high-performance computer to be used for executing the job to be executed in the at least one available computing cluster, and a job execution service name; and submitting the job to be executed identified by the global identifier of the job to the high-performance computer for executing the job to be executed specified by the device identifier by a job execution service matched with the job execution service name according to the device identifier and the global identifier of the job to be executed contained in the scheduling result.

2. The method according to claim 1, wherein the request description information further comprises one or more of an application name required by the job, a queue name required by the job, and a CPU count of one high-performance computer required by the job;

the computing resource information comprises an application list and an application resource, the application list is configured to indicate at least one application deployed in at least one high-performance computer in the at least one available computing cluster, the application resource is configured to indicate at least one computing queue that each high-performance computer in the at least one computing cluster contains, and each computing queue comprises an available CPU count of its high-performance computer; and determining the job scheduling result of the job to be executed according to the computing resource description information comprises:

determining that a high-performance computer containing a computing queue specified by the queue name required by the job is the high-performance computer for executing the job to be executed; or determining that a high-performance computer whose available CPU count is not less than the CPU count of the high-performance computer required by the job is the high-performance computer for executing the job to be executed; or determining that a high-performance computer deployed with an application specified by the application name required by the job is the high-performance computer for executing the job to be executed.

3. The method according to claim 1, wherein the request description information further comprises one or more of a job name, a version of an application required by the job, and an expected wall time of the job.

4. The method according to claim 1, further comprising: executing the job on the high-performance computer.

5. A task scheduling method, comprising:

receiving, by a computer, a job execution request of a job to be executed, the job execution request comprising request description information of the job to be executed, the request description information comprising a job scheduling algorithm name and a global identifier of the job to be executed, the job scheduling algorithm name being a name of a job scheduling algorithm, and each of more than one scheduling service module being configured with an associated cluster computing resource information query interface for running one corresponding job scheduling algorithm; and acquiring, by the computer, the job scheduling algorithm matched with the job scheduling algorithm name from the request description information through an associated cluster computing resource information query interface of one of the more than one scheduling service module matched with the job scheduling algorithm name from the request description information, and determining a job scheduling result of the job to be executed according to computing resource description information of at least one available computing cluster by using the job scheduling algorithm, the job scheduling result comprising the global identifier of the job to be executed, a device identifier of a high-performance computer to be used for executing the job to be executed in the at least one available computing cluster, and a job execution service name.

6. The method according to claim 5, further comprising:

submitting the job to be executed identified by the global identifier of the job to the high-performance computer for executing the job to be executed specified by the device identifier by a job execution service matched with the job execution service name according to the device identifier and the global identifier of the job to be executed contained in the scheduling result.

7. The method according to claim 5, wherein the request description information further comprises one or more of an application name required by the job, a queue name required by the job, and a CPU count of one high-performance computer required by the job; and the computing resource information comprises an application list and an application resource, the application list is configured to indicate at least one application deployed in at least one high-performance computer in the at least one available computing cluster, the application resource is configured to indicate at least one computing queue that each high-performance computer in the at least one computing cluster contains, and each computing queue comprises an available CPU count of its high-performance computer.

8. The method according to claim 7, wherein the determination of the job scheduling result of the job to be executed according to the computing resource description information further comprises:

determining, by the computer, that a high-performance computer containing a computing queue specified by the queue name required by the job is the high-performance computer for executing the job to be executed.

9. The method according to claim 7, wherein the determination of the job scheduling result of the job to be executed according to the computing resource description information further comprises:

determining, by the computer, that a high-performance computer whose available CPU count is not less than the CPU count of the high-performance computer required by the job is the high-performance computer for executing the job to be executed.

10. The method according to claim 7, wherein the determination of the job scheduling result of the job to be executed according to the computing resource description information further comprises:

determining, by the computer, that a high-performance computer deployed with an application specified by the application name required by the job is the high-performance computer for executing the job to be executed.

11. The method according to claim 5, wherein the request description information further comprises one or more of a job name, a version of an application required by the job, and an expected wall time of the job.

12. The method according to claim 5, further comprising:
executing the job on the high-performance computer.

\* \* \* \* \*